(12) United States Patent
Freudenthal et al.

(10) Patent No.: US 11,054,672 B2
(45) Date of Patent: Jul. 6, 2021

(54) DUAL TRANSDUCER PHOTOELASTIC MODULATOR

(71) Applicant: Hinds Instruments, Inc., Hillsboro, OR (US)

(72) Inventors: John Freudenthal, Portland, OR (US); Baoliang Wang, Portland, OR (US)

(73) Assignee: Hinds Instruments, Inc., Hillsboro, OR (US)

( * ) Notice: Subject to any disclaimer, the term of this patent is extended or adjusted under 35 U.S.C. 154(b) by 81 days.

(21) Appl. No.: 16/206,398

(22) Filed: Nov. 30, 2018

(65) Prior Publication Data

US 2019/0171042 A1 Jun. 6, 2019

Related U.S. Application Data

(60) Provisional application No. 62/593,628, filed on Dec. 1, 2017.

(51) Int. Cl.
*G02F 1/03* (2006.01)
*G02F 1/07* (2006.01)
*G02F 1/01* (2006.01)

(52) U.S. Cl.
CPC .......... *G02F 1/0131* (2013.01); *G02F 1/0123* (2013.01)

(58) Field of Classification Search
CPC .............................. G02F 1/0131; G02F 1/0123
USPC ....................... 356/33, 34; 359/240, 246, 286
See application file for complete search history.

(56) References Cited

U.S. PATENT DOCUMENTS

| 3,867,014 A | 2/1975 | Kemp |
| 6,970,278 B1 | 11/2005 | Buican |
| 9,780,870 B1 | 10/2017 | Zortman |

OTHER PUBLICATIONS

Ametek Scientific Instruments. "7270 General Purpose DSP Lock-in Amplifier." Signal Recovery, www.ameteksi.com/products/lock-in-amplifiers/7270-general-purpose-dsp-lock-in-amplifier. Jul. 16, 2020.*
Earth Science Airborne Program, "Airborne Multi-angle SpectroPolarimeter Imager," *Jet Propulsion Laboratory, California Institute of Technology*, https://airbornescience.jpl.nasa.gov/instruments/airmspi, 3 pages, obtained Nov. 30, 2017.
Li et al., "45° double-drive photoelastic modulation," *Journal of Optical Society of America*, 33(10):2041-2046 (Oct. 2016).
Li et al., "Modulation axis performs circular motion in a 45° dual-drive symmetric photoelastic modulator," *Review of Scientific Instruments*, 87(12):123103-123103-5 (Dec. 2016).

* cited by examiner

*Primary Examiner* — Mahidere S Sahle
(74) *Attorney, Agent, or Firm* — Klarquist Sparkman, LLP

(57) ABSTRACT

An apparatus includes a photoelastic modulator (PEM) optical element including a first driving axis and a second driving axis arranged at a selected angle with respect to each other and perpendicular to an optical axis, wherein the first driving axis and the second driving axis extend respective predetermined non-equal lengths that correspond to respective predetermined non-equal natural first and second PEM frequencies $f_1$ and $f_2$. Methods of manufacture and operation are also disclosed.

25 Claims, 4 Drawing Sheets

DUAL TRANSDUCER PHOTOELASTIC MODULATOR

CROSS-REFERENCE TO RELATED APPLICATION

This application claims the benefit of U.S. Provisional Patent Application No. 62/593,628, filed Dec. 1, 2017, and is incorporated by reference herein in its entirety.

FIELD

The field pertains to photoelastic modulators.

BACKGROUND

Photoelastic modulation has been used for a wide range of polarimetry applications, including ellipsometry, remote sensing, and circular dichroism analysis. However, typical photoelastic modulators are driven along only a single modulation axis or multiple photoelastic modulators are used that must be carefully aligned and that are prone to misalignment. Therefore, a need remains for improved photoelastic modulator apparatus and methods.

SUMMARY

Among the example embodiments disclosed herein is an apparatus that comprises a photoelastic modulator (PEM) optical element including a first driving axis and a second driving axis arranged at a selected angle with respect to each other and perpendicular to an optical axis, wherein the first driving axis and the second driving axis extend respective predetermined non-equal lengths that correspond to respective predetermined non-equal natural first and second PEM frequencies $f_1$ and $f_2$.

Another example embodiment of the disclosed technology is an apparatus that comprises a dual-frequency photoelastic modulator (PEM) element including a pair of PEM driving axes situated at a predetermined angle with respect to each other and extending to predetermined respective non-equal lengths that correspond to predetermined non-equal natural frequencies, and a pair of transducers coupled to the PEM element so as to drive the PEM element along the respective driving axes at the respective non-equal natural frequencies.

According to further embodiments of the disclosed technology, example methods include driving a first axis of a plurality of driving axes of a photoelastic modulator (PEM) element at a first natural frequency associated with the first axis, wherein the plurality of driving axes are situated at predetermined angles with respect to each other and extend predetermined respective non-equal lengths that correspond to predetermined non-equal natural frequencies, and detecting a beam modulated by the PEM element driven along the first axis.

According to still further embodiments of the disclosed technology, example methods include selecting non-equal driving axis lengths for a photoelastic modulator (PEM) optical element based on predetermined first and second PEM frequencies $f_1$ and $f_2$, and forming a singular PEM optical element having the selected non-equal driving axis lengths arranged at a selected angle with respect to each other so that the PEM optical element has the respective non-equal natural first and second PEM frequencies $f_1$ and $f_2$ associated with the respective lengths.

The foregoing and other objects, features, and advantages of the disclosed technology will become more apparent from the following detailed description, which proceeds with reference to the accompanying figures.

DETAILED DESCRIPTION

Figure 1:
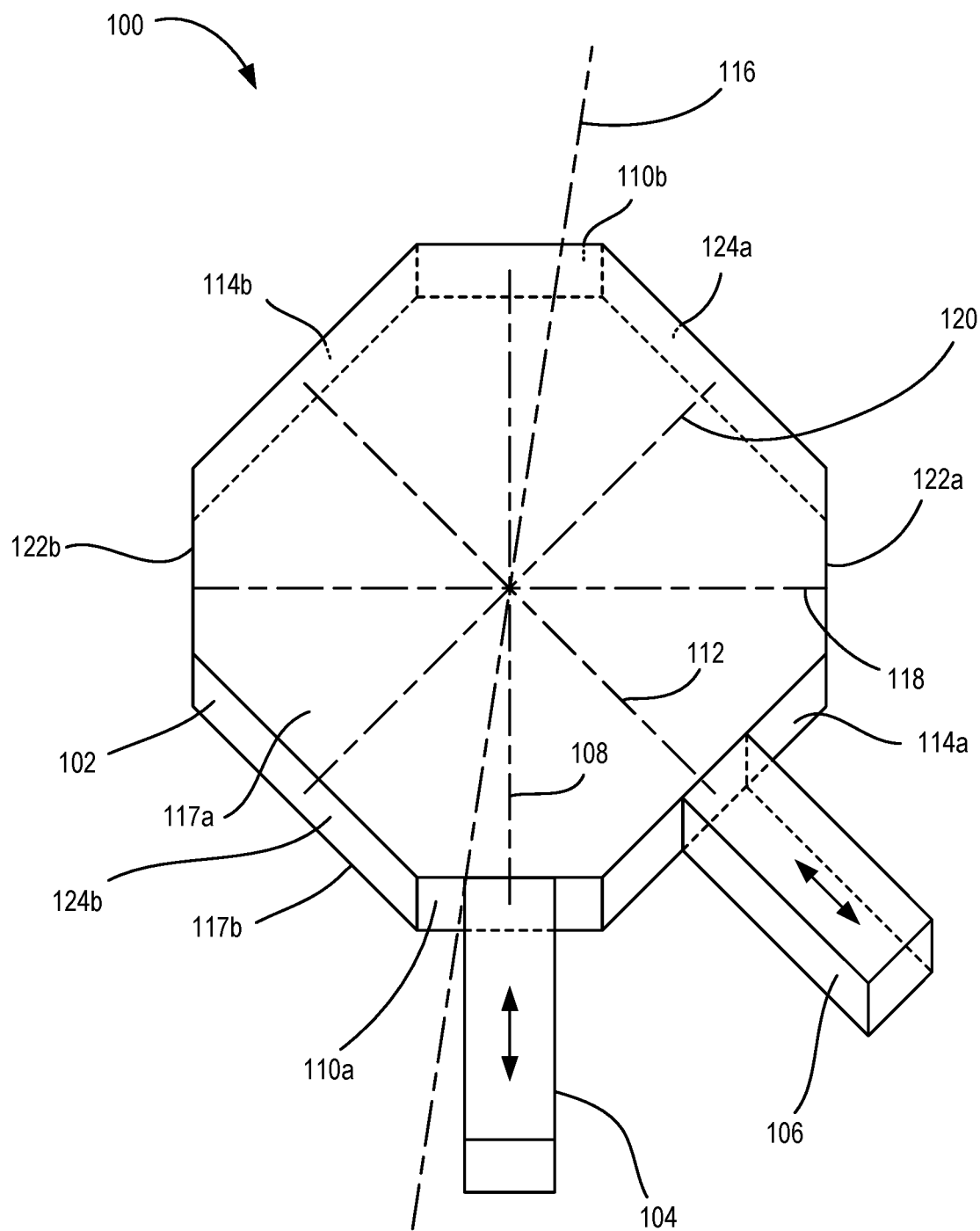
FIG. 1 is a perspective view of an example photoelastic modulator assembly.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

Disclosed herein are photoelastic modulator (PEM) optical element examples that include a plurality of driving axes in the same element. Thus, in examples herein "PEM optical element" refers to a single PEM optical element as opposed to separate PEM optical elements that are spaced apart from each other and separately driven. In typical examples, PEM optical element driving axes are arranged perpendicularly to an optical axis. Optical sources can direct optical beams to the PEM optical element along the optical axis or at various angles with respect to the optical axis. Representative PEM optical elements include input and/or output surfaces that are parallel to the driving axes and perpendicular to the optical axis, though other angles with respect to each are also possible.

In FIG. 1, a photoelastic modulation (PEM) assembly 100 is shown that includes an octagonally-shaped photoelastic modulator (PEM) optical element 102. In some examples, the PEM assembly 100 further includes a pair of transducers 104, 106. The PEM optical element 102 includes a first driving axis 108 and corresponding length extending between opposite surfaces 110a, 110b. The transducer 104 is coupled to the surface 110a so that the PEM optical element 102 can be vibrated along the first driving axis 108. For example, an end of the transducer 104 can be secured to the surface 110a with an adhesive. In representative examples, the PEM optical element 102 can be driven by the transducer 104 at a natural resonant frequency $f_1$ of the PEM optical element 102 associated with the length of the first driving axis 108, with an increased length corresponding to a reduction in the natural frequency $f_1$. The PEM optical element 102 further includes a second driving axis 112 and corresponding length extending between opposite surfaces 114a, 114b. In representative examples, the second driving axis 112 extends to form a 45° angle with the first driving axis 108. The transducer 106 is coupled to the surface 114a so that the PEM optical element 102 can be vibrated along the second driving axis 112. In representative examples, the PEM optical element 102 can be driven by the transducer 106 at a natural frequency $f_2$ of the PEM optical element 102 associated with the length of the second driving axis 112. The first driving axis 108 and second driving axis 112 have different predetermined lengths so that the natural frequencies $f_1$ and $f_2$ are different (e.g., by a predetermined amount $|f_1-f_2|$). In representative embodiments, the transducers 104, 106 are frequency-matched to the respective natural frequencies $f_1$, $f_2$.

The PEM assembly 100 also includes an optical axis 116 (shown slightly at an angle for clarity) that is generally perpendicular to the first driving axis 108 and the second driving axis 112 and generally defines a receiving and/or emission direction for light. Thus, in typical examples, light propagates along or in relation to (e.g., at an angle) to the optical axis 116 and is received by the PEM optical element 102. By propagation through the PEM optical element 102 between opposite surfaces 117a, 117b, the incident light is modulated based on photoelastic variation produced with the vibration imparted to the PEM optical element 102 along one or both of the first driving axis 108 and the second driving axis 112.

The predetermined different natural frequencies $f_1$, $f_2$ and the frequency difference $|f_1-f_2|$, can be selected based on (and can therefore vary between) particular photoelastic modulation application. In some examples, a smaller frequency difference $|f_1-f_2|$ may be preferred, such as for integration into imaging systems. In other examples, a larger frequency difference $|f_1-f_2|$ can be used, e.g., for integration into lock-in amplifier based instruments. In further examples, the frequencies $f_1$, $f_2$ are selected for a particular application. In various examples, the frequency difference $|f_1-f_2|$ can be selected to be in the range of tens of Hz, hundreds of Hz, or kHz (e.g., 10 Hz, 20 Hz, 50 Hz, 100 Hz, 200 Hz, 500 Hz, 1 kHz, 2 kHz, 5 kHz, etc.). In various examples, $f_1$ (or $f_2$) is selected to be in the range of 20 kHz to 500 kHz, including for example, 22 kHz, 44 kHz, 48 kHz, 54 kHz, 64 kHz, 80 kHz, 105 kHz, etc. The frequency difference $|f_1-f_2|$ can also be determined based on a frequency percentage of $f_1$ (or $f_2$), such as 0.1%, 0.2%, 0.5%, 1%, 2%, 5%, 10%, 25%, 40%, 50%, etc. The frequency difference $|f_1-f_2|$ and the respective frequencies $f_1$, $f_2$ can be selected so as to have a reduced harmonic association so as to improve frequency and phase independence and corresponding detection and lock-in capability. In a particular example, $f_1$ and $f_2$ are selected to be 42 kHz and 47 kHz, respectively, and in another particular example, $f_1$ and $f_2$ are 50 kHz and 60 kHz, respectively. Representative embodiments can operate more efficiently by driving at the different predetermined frequencies $f_1$ and $f_2$ than operating at a common intermediate frequency having a lower efficiency, such as $(f_1+f_2)/2$.

In representative examples, though the PEM optical element 102 has an irregular shape based on the different lengths of the first and second driving axes 108, 112, the PEM optical element 102 can also have symmetrical properties. For example, a first complementary modulation axis 118 extends perpendicular to the first driving axis 108 and perpendicular to the optical axis 116. In symmetrical examples, the first complementary modulation axis 118 has a length that is equal or substantially equal (e.g., greater than 95%, 98%, 99%, 99.9%) to the predetermined length of the first driving axis 108. Similarly, a second complementary modulation axis 120 extends perpendicular to the second driving axis 112 and perpendicular to the optical axis 116 and can have a length that is equal or substantially equal to the predetermined length of the second driving axis 112. In some examples, the first complementary modulation axis 118 can have a length that is not equal to the first driving axis 108, and the second complementary modulation axis 120 can have a length that is not equal to the second driving axis 112.

In some embodiments, the PEM optical element 102 includes a pair of parallel surfaces 122a, 122b at opposite ends of the first complementary modulation axis 118 and a pair of parallel surfaces 124a, 124b at opposite ends of the second complementary modulation axis 120. In typical symmetrical examples, the lengths of the parallel surfaces 110a, 110b extending perpendicular to the first driving axis 108 and the optical axis 116 are equal or substantially equal to each other and to the lengths of the parallel surfaces 122a, 122b extending perpendicular to the first complementary modulation axis 118 and the optical axis. Also, the lengths of the parallel surfaces 114a, 114b extending perpendicular to the second driving axis 112 and the optical axis 116 can be equal or substantially equal to each other and to the lengths of the parallel surfaces 124a, 124b extending perpendicular to the second complementary modulation axis 120 and the optical axis 116. In some embodiments, an octagonal shape can be defined by the pairs of parallel surfaces 110a, 110b, 114a, 114b, 122a, 122b, 124a, 124b.

Figure 2:
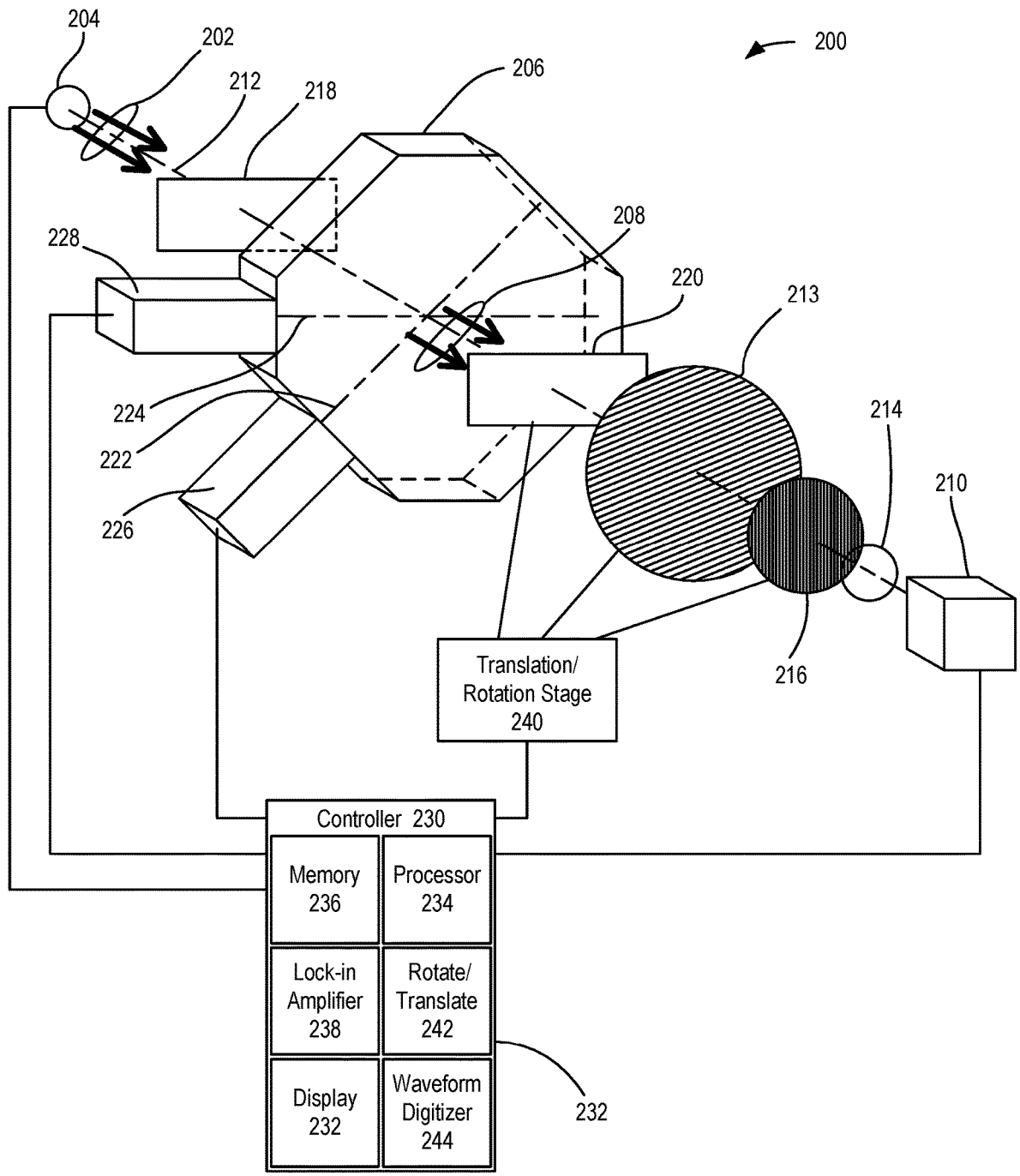
FIG. 2 is a perspective schematic of an example photoelastic modulator apparatus.

FIG. 2 shows an example PEM apparatus 200 situated to modulate an input beam 202 for various applications, including circular and linear polarimetry. The PEM apparatus 200 includes an optical source 204 situated to provide the input beam 202, a dual PEM optical element 206 situated to receive the input beam 202 and to modulate polarization characteristics of the input beam 202 and form a modulated beam 208, and a detector 210 situated to receive the modulated beam 208, such as a CCD, CMOS sensor, photodiode, spectrometer, or other optical sensor. In some examples, one or more other optical components can be included in various positions relative to an optical axis 212 of the PEM apparatus 200, and in various combinations, including one or more polarizers, lens/mirrors, waveplates, and optical samples. In one example, an analyzer 213 can be situated to receive the modulated beam 208 from the dual PEM optical element 206 so as to provide the modulated beam 208 with a well-defined polarization state. Example analyzers can include linear polarizers, circular polarizers, calcite polarizers, Glan-Taylor prisms, Glan-Foucault prisms, absorptive polarizers, etc. In another example, a lens 214 is situated to direct the modulated beam 208 to the detector 210. In a further example, one or more waveplates 216, instead of or in addition to the analyzer 213, are situated to change a linear polarization angle or change between linear and circular polarization. In additional examples, one or more sample receptacles 218, 220 are situated to hold an optical sample that is to be examined at a position along the optical axis 212 of the PEM apparatus 200. It will be appreciated that in some examples, an optical sample can correspond to the light provided by the optical source 204. In some examples, light of a selected polarization is provided. In further examples, one or more additional polarizers and/or waveplates can be situated between the optical source 204 and the dual PEM optical element 206.

The dual PEM optical element 206 includes a first modulation axis 222 and a second modulation axis 224 each extending respective selected non-equal lengths perpendicular to the optical axis 218 so as to define respective selected, non-equal natural resonant frequencies $f_1$, $f_2$. In representative embodiments, the first and second modulation axes 222, 224 extend at 45 degrees with respect to each other. First and second transducers 226, 228 are coupled to the dual PEM optical element 206 so as to vibrate the dual PEM optical element 206 along the respective first and second modulation axes 222, 224. The PEM apparatus 200 further includes a controller 230 that is coupled to the transducers 226, 228 so as to control the timing and frequency of the transducer vibration of the dual PEM optical element 206 along the first and second modulation axes 222, 224. In some examples, the timing and frequency of the transducer vibration of the first or second modulation axis 222, 224 is controlled independently from the other of the first or second modulation axis 222, 224, and in other examples, the modulation axes 222, 224 are driven according to a phase relationship. The controller 230 is also coupled to the detector 210 so as to receive a signal associated with the detected modulated beam 208. During operation, one or both of the modulation axes 222, 224 can be vibrated to produce a photoelastic modulation of the dual PEM optical element 206. In particular examples, the modulation axes 222, 224 are driven at the respective natural resonant frequencies $f_1$, $f_2$. In some examples, the frequency difference $|f_1-f_2|$ is selected to correspond to a beat frequency that is within a detection bandwidth of the detector 210.

The controller 230 can include a computing environment 232 having one or more processors 234 and memories 236. In some examples, the processor 234 can be configured based on reduced or complex instruction set computing architectures, and can include one or more general purpose central processing units, application specific integrated circuits, graphics or co-processing units or other processing units. In various examples, the computing environment can be distributed in the form of separate processors and/or other computing or controller devices in communication with one or more other components of the computing environment 232 or PEM apparatus 200, including one or more FPGA, PLC, PLD, CPLD, PAL, ASIC, PLL, control logic, relay, detector, amplifier, digitizer, etc. The memory 236 can be volatile memory (e.g., registers, cache, RAM), non-volatile memory (e.g., ROM, EEPROM, flash memory, etc.), or a combination of volatile and non-volatile memory. The memory 236 is generally accessible by the processor 234 and can store software in the form computer-executable instructions that can be executed by the processor 234 coupled to the memory 236. The memory 236 can also include removable or non-removable storage including magnetic media, CD-ROMS, DVDs, or any other medium that can be used to store information in a non-transitory way and which can be accessed within the computing environment 232.

In typical examples, the memory 236 can store instructions, data arrays, look-up tables, etc., implementing one or more method steps and algorithms described herein. For example, the controller 230 can adjust transducer driving frequency or phase based on the signal received from the detector 210 and one or more lock-in amplifiers 238. In some examples, the detected characteristics of the modulated beam 208 can be correlated to determine Stokes polarimetry parameters Q, U, and V, based on, e.g., Mueller matrix calculus. In some examples, the PEM apparatus 200 can include one or more translation and/or rotation stages 240 coupled to one or more components, such as the analyzer 213, waveplate 216, sample receptacle 220, etc. The controller 230 can include a rotate/translate control 242 coupled to the stage 240 so as to command the corresponding stage movement. The singular structure of the dual PEM element 206 eliminates the need for an angular adjustment between the first and second modulation axes 222, 224, which are situated in a fixed angular orientation relative to each other. However, in some examples, the dual PEM element 206 can be rotated as needed. In some examples, the controller 230 includes a waveform digitizer 244 that can sample and capture the waveform or a portion of a waveform associated with the modulated beam 208. The controller 230 can include a display 246 configured to show one or more waveforms or PEM data associated with the modulated beam 208.

Figure 3:
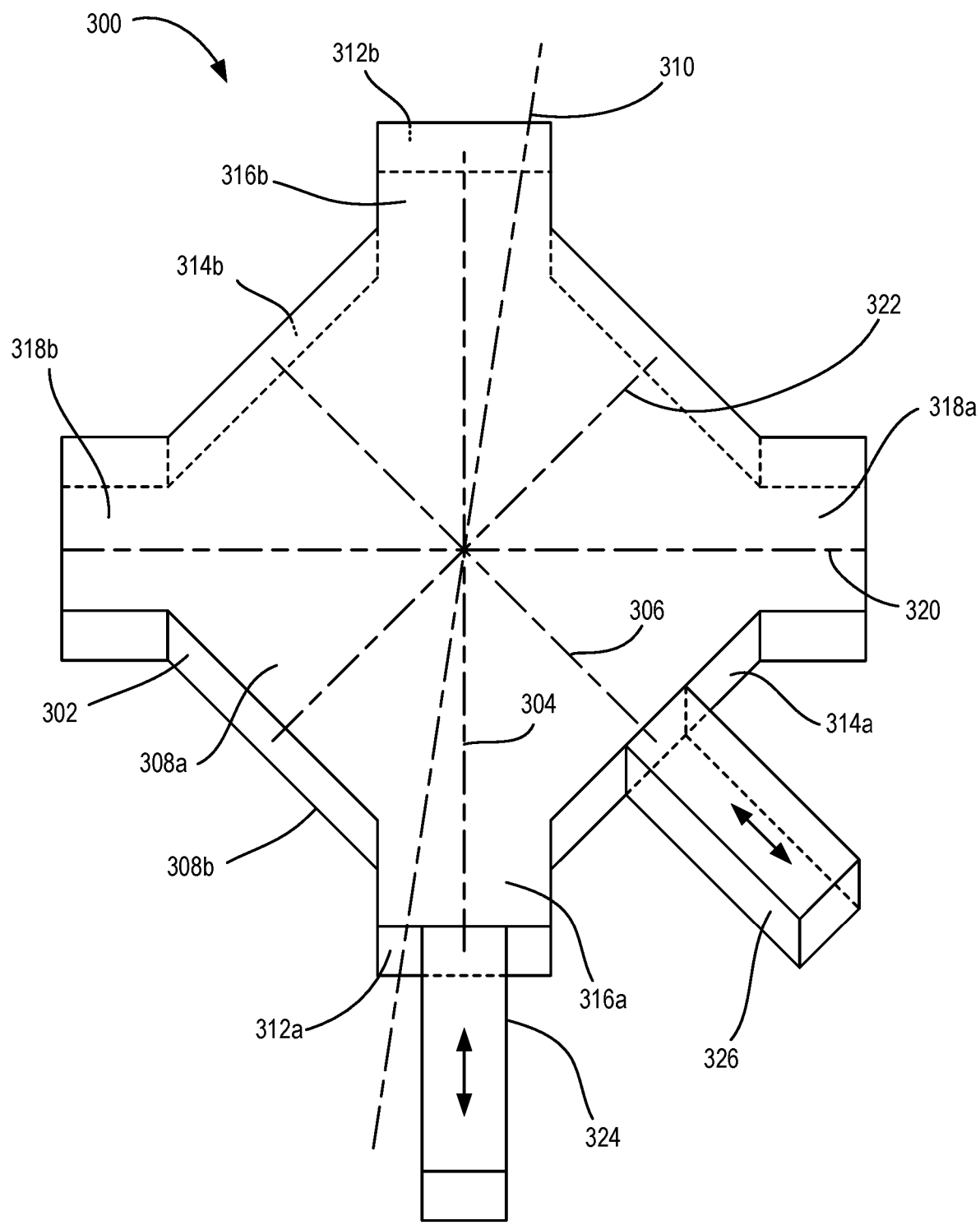
FIG. 3 is a perspective view of another example photoelastic modulator assembly.

FIG. 3 shows a photoelastic modulator (PEM) assembly 300 that includes a PEM optical element 302 having a first modulation axis 304 extending a first length and a second modulation axis 306 arranged at 45 degrees to the first modulation axis 304 and extending a second length that is shorter than the first length. The modulation axes 304, 306 are generally parallel to opposite input and output surfaces 308a, 308b and generally perpendicular to an optical axis 310 (shown at an oblique angle for clarity). In representative examples, opposite parallel surfaces 312a, 312b extend perpendicular to the first modulation axis 304 from opposite ends of the first modulation axis 304, and opposite parallel surfaces 314a, 314b extend perpendicular to the second modulation axis 306 from opposite ends of the second modulation axis 306. The increased length of the first modulation axis 304 is associated with optical element extension portions 316a, 316b, and with optical element extension portions 318a, 318b for an associated complementary modulation axis 320 that is complementary to the first modulation axis 304. The second modulation axis 306 is associated with a complementary modulation axis 322. In some examples, the length of the surfaces 312a, 312b and 314a, 314b perpendicular to optical axis 310 can be selected to be equal or non-equal for a range of different selected lengths of the first and second modulation axes 304, 306. The PEM assembly 300 can further include a pair of transducers 324, 326 coupled to the respective first and second modulation axes 304, 306 so as to vibrate the PEM optical element 302 along the respective first and second modulation axes 304, 306 at the different natural frequencies associated with the respective lengths of the first and second modulation axes 304, 306.

Figures 4, 5:
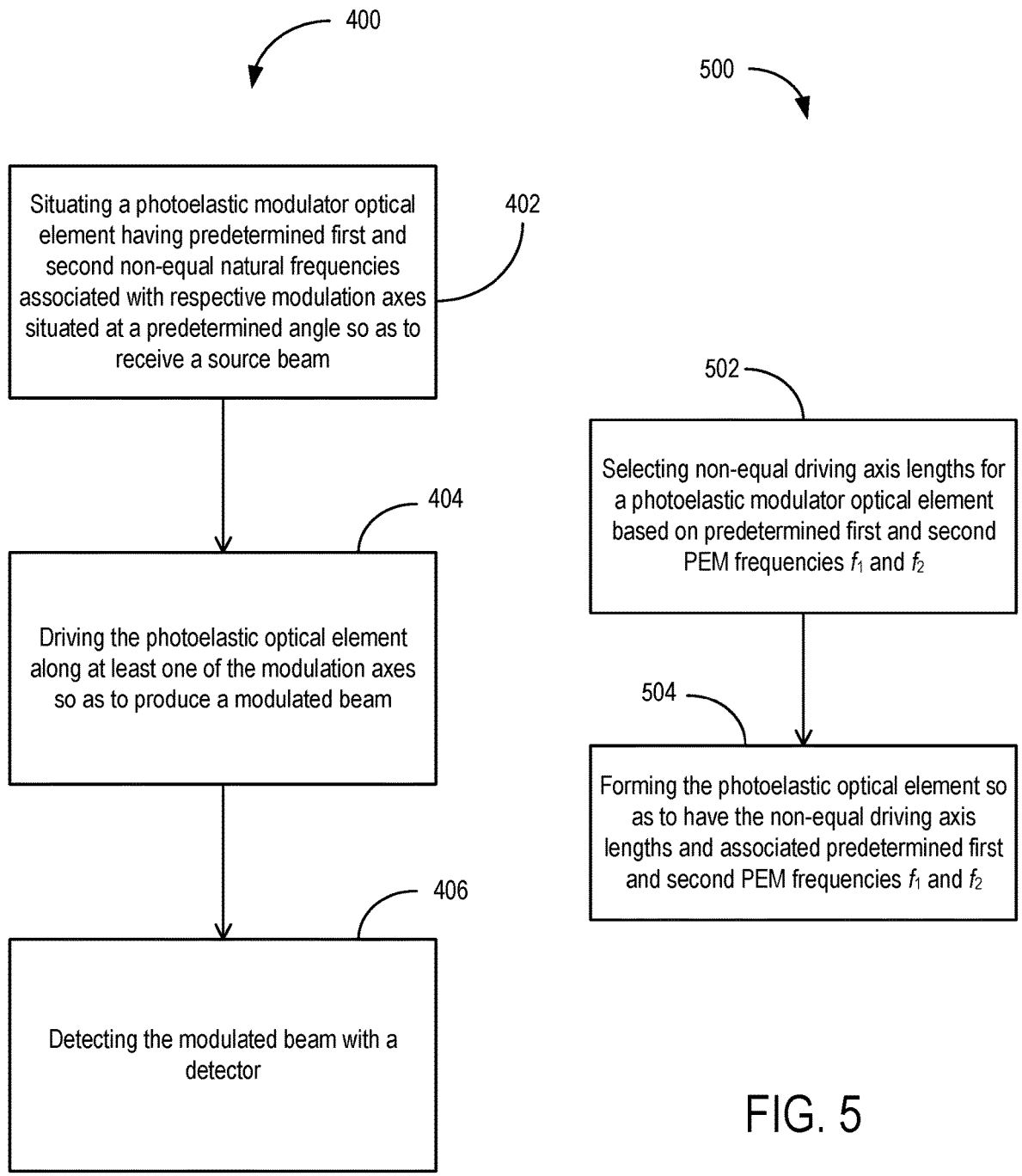
FIG. 4 is a flowchart of a method of operating a photoelastic modulator apparatus.
FIG. 5 is a flowchart of a method of forming a photoelastic modulator optical element.

FIG. 4 shows a method 400 of photoelastic modulation with a dual-axis PEM optical element. Example multi-axis PEM optical elements are unitary structures that include a plurality of photoelastic modulation axes extending at a predetermined angle with respect to each other (e.g., 45 degrees). The modulation axes have respective non-equal lengths that correspond to predetermined respective natural oscillation frequencies (e.g., a first natural frequency defined by a first modulation axis, and a second natural frequency defined by a second modulation axis). At 402, a multi-axis PEM optical element having predetermine first and second non-equal natural frequencies associated with respective modulation axis lengths is situated to receive a source beam to be modulated. An optical axis or other reference axis typically extends perpendicularly with respect to the photoelastic modulation axes, and the source beam can be directed in relation to the optical axis, such as on-axis, parallel, or at one or more angles.

At 404, the photoelastic optical element is driven along at least one of the photoelastic modulation axes so as to produce a modulated beam that exits the PEM optical element. The modulation axis is typically driven with a vibrational element, such as a transducer, coupled to a receiving portion of the photoelastic optical element, such as an end surface adjoining the driven modulation axis. At 406, the modulated beam is detected with a detector, such as an optical detector. In different examples, the source beam or modulated beam can receive additional beam manipulations prior to detection, and the beams can be directed along various paths. For example, a sample to be analyzed can be situated to receive the source beam before propagation through PEM optical element or to receive the modulated beam. The source beam or modulated beam can be directed through one or more polarizers, optical filters, analyzers, waveplates, lenses, etc. In further examples, more than one of the modulation axes with predetermined non-equal natural frequencies can be driven simultaneously asynchronously or synchronously.

FIG. 5 shows a method 500 of producing a multi-axis PEM optical element. Suitable materials for PEM optical elements include various transparent materials exhibiting birefringence variation in response to stress variation, such as fused silica. At 502, non-equal driving axis lengths, arranged at non-perpendicular angles (e.g., 45 degrees) are selected for the PEM optical element based on predetermined first and second PEM frequencies $f_1$, $f_2$. At 504, the photoelastic element is formed so as to have the non-equal driving axis lengths associated with the predetermined first and second PEM frequencies $f_1$, $f_2$. For example, bulk material can be machined or a mold can be used that is dimensioned to provide the predetermined lengths.

Having described and illustrated the principles of the disclosed technology with reference to the illustrated embodiments, it will be recognized that the illustrated embodiments can be modified in arrangement and detail without departing from such principles. For instance, elements of the illustrated embodiments can be implemented in software or hardware. Also, the technologies from any example can be combined with the technologies described in any one or more of the other examples. It will be appreciated that some procedures and functions such as those described with reference to the illustrated examples can be implemented in a single hardware or software module, or separate modules can be provided. The particular arrangements above are provided for convenient illustration, and other arrangements can be used.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope of the appended claims.

The invention claimed is:

1. An apparatus, comprising:
a photoelastic modulator (PEM) optical element including a first driving axis extending a first driving axis length between opposing surfaces and a second driving axis extending a second driving axis length between opposing surfaces, wherein the first and second axes are arranged at a selected angle with respect to each other and perpendicular to an optical axis, wherein the first driving axis length and the second driving axis length extend respective predetermined non-equal lengths that define respective predetermined non-equal first and second natural resonant PEM frequencies $f_1$ and $f_2$ for the PEM optical element.

2. The apparatus of claim 1, wherein the difference between the predetermined non-equal lengths is selected in the range of 0.001% to 20% of the length of one of the first driving axis or the second driving axis.

3. The apparatus of claim 1, wherein the difference between the first and second PEM frequencies $|f_1-f_2|$ is selected in the range of 1 Hz to 10 kHz.

4. The apparatus of claim 1, further comprising a first complementary modulation axis perpendicular to the first driving axis and the optical axis, and a second complementary modulation axis perpendicular to the second driving axis and the optical axis.

5. The apparatus of claim 4, wherein the first complementary modulation axis has a length that is substantially equal to the first driving axis and the second complementary modulation axis has a length that is substantially equal to the second driving axis.

6. The apparatus of claim 1, wherein the PEM optical element includes first pair of parallel surfaces, corresponding to the opposing surfaces associated with the first driving axis, at opposite ends of the first driving axis, a second pair of parallel surfaces at opposite ends of the first complementary modulation axis, a third pair of parallel surfaces, corresponding to the opposing surfaces associated with the second driving axis, at opposite ends of the second driving axis, and a fourth pair of parallel surfaces at opposite ends of the second complementary modulation axis;
wherein the lengths of the first pair of parallel surfaces extending perpendicular to the first driving axis and the optical axis are substantially equal to each other and to the lengths of the second pair of parallel surfaces extending perpendicular to the first complementary modulation axis and the optical axis;
wherein the lengths of the third pair of parallel surfaces extending perpendicular to the second driving axis and the optical axis are substantially equal to each other and to the lengths of the fourth pair of parallel surfaces extending perpendicular to the second complementary modulation axis and the optical axis.

7. The apparatus of claim 6, wherein the first, second, third, and fourth pairs of parallel surfaces form an octagon.

8. The apparatus of claim 1, further comprising a first transducer coupled to the photoelastic optical element so as to drive the photoelastic optical element along the first driving axis at the first PEM frequency, and a second transducer coupled to the photoelastic optical element so as to drive the photoelastic optical element along the second driving axis at the second PEM frequency.

9. The apparatus of claim 8, further comprising a controller coupled to the first and second transducers so as to provide a first driving signal to the first transducer to drive the PEM optical element along the first driving axis at the first PEM frequency and a second driving signal to the to the second transducer to drive the PEM optical element along the second driving axis at the second PEM frequency.

10. The apparatus of claim 9, wherein the controller comprises separate first and second control modules situated to control the respective first and second transducers.

11. The apparatus of claim 8, further comprising:
an optical source situated to direct a light beam to an input aperture of the PEM optical element situated about the optical axis; and
an analyzer having a linear polarization axis that bisects the selected angle between the first driving axis and the second driving axis and is situated to receive the light beam as a modulated light beam from an output aperture of the PEM optical element.

12. The apparatus of claim 11, further comprising an optical detector situated to receive the modulated light beam from the analyzer as a linearly polarized modulated light beam and produce a detection signal.

13. The apparatus of claim 12, further comprising at least one lock-in amplifier situated to produce a lock-in signal based on the detected signal and a reference signal corresponding to $f_1$, $f_2$, a combination of $f_1$ and $f_2$, or a harmonic of $f_1$, $f_2$, or harmonic combination of $f_1$ and $f_2$.

14. The apparatus of claim 13, wherein the reference signal corresponds to a frequency $f_1$, $2f_1$, or $2f_2$ so that the lock-in signal is associated with respective Stokes parameters V, U, or Q of a polarization state of the light beam received by the PEM optical element.

15. The apparatus of claim 13, wherein the at least one lock-in amplifier includes separate lock-in amplifiers to provide respective lock-in signals based on different reference signals.

16. The apparatus of claim 12, further comprising a waveform digitizer situated to produce a waveform corresponding to the detected signal.

17. The apparatus of claim 12, wherein the detector is situated to detect a beat frequency $|f_2-f_1|$.

18. An apparatus, comprising:
a dual-frequency photoelastic modulator (PEM) element including a pair of PEM driving axes situated at a predetermined angle with respect to each other and each extending along the axes between respective sets of opposing surfaces to predetermined respective non-equal lengths that define respective predetermined non-equal natural frequencies; and
a pair of transducers coupled to the PEM element so as to drive the PEM element along the respective driving axes at the respective non-equal natural frequencies.

19. The apparatus of claim 18, further comprising:
a detector situated to detect an optical beam modulated by the dual-frequency PEM element; and
a controller in communication with the detector and the plurality of the transducers so as to control the driving of the PEM element based on the detected modulated optical beam.

20. A method, comprising:
driving a first driving axis of a plurality of driving axes of a photoelastic modulator (PEM) element with a transducer at a first natural resonant frequency defined by a first length along the first driving axis between a first set of opposing surfaces of the PEM, wherein the plurality of driving axes are situated at predetermined angles with respect to each other and includes at least a second driving axis, wherein the PEM includes a second set of opposing surfaces separated by a second length along the second driving axis that defines a second natural resonant frequency, wherein the first and second lengths are predetermined non-equal lengths that define the first and second natural resonant frequencies as predetermined non-equal natural resonant frequencies; and
detecting a beam modulated by the PEM element driven along the first driving axis.

21. The method of claim 20, further comprising driving the second driving axis of the plurality of driving axes of the PEM element at the second natural resonant frequency.

22. The method of claim 21, wherein the first and second driving axes are driven simultaneously.

23. The method of claim 22, wherein the simultaneously driving of the first and second driving axes is asynchronous such that a phase difference between the first and second driving frequencies is independently varying.

24. The method of claim 20, further comprising determining one or more Stokes polarimetry parameters based on the detected modulated beam.

25. A method, comprising:
selecting non-equal driving axis lengths for a photoelastic modulator (PEM) optical element based on predetermined first and second non-equal PEM natural resonant frequencies $f_1$ and $f_2$, wherein each of the driving axis lengths is defined by a distance between a respective set of opposing surfaces of the PEM; and
forming a singular PEM optical element having the selected non-equal driving axis lengths arranged at a selected angle with respect to each other so that the PEM optical element has the respective non-equal natural first and second PEM frequencies $f_1$ and $f_2$ as defined by the respective lengths.

* * * * *